United States Patent [19]

Brömmel

[11] 4,284,478
[45] Aug. 18, 1981

[54] APPARATUS FOR QUENCHING HOT COKE

[75] Inventor: Walter Brömmel, Mülheim-Ruhr, Fed. Rep. of Germany

[73] Assignee: Didier Engineering GmbH, Essen, Fed. Rep. of Germany

[21] Appl. No.: 181,398

[22] Filed: Aug. 22, 1980

Related U.S. Application Data

[62] Division of Ser. No. 952,135, Oct. 17, 1978, Pat. No. 4,246,072.

[30] Foreign Application Priority Data

Aug. 19, 1977 [DE] Fed. Rep. of Germany ....... 2737624
Aug. 19, 1977 [DE] Fed. Rep. of Germany ....... 2737625

[51] Int. Cl.³ ........................................... C10B 39/08
[52] U.S. Cl. ................................................. 202/227
[58] Field of Search ..................... 201/39; 202/227, 95, 202/253; 203/10

[56] References Cited

U.S. PATENT DOCUMENTS

| | | |
|---|---|---|
| 2,975,106 | 3/1961 | Becker . |
| 3,212,999 | 10/1965 | Sommers, Jr. . |
| 3,312,600 | 4/1967 | Morton . |
| 3,532,606 | 10/1970 | Sibert . |
| 3,684,664 | 8/1972 | Stratmann et al. . |
| 3,790,448 | 2/1974 | Didycz et al. . |
| 3,806,032 | 4/1974 | Pries . |
| 3,876,143 | 4/1975 | Rossow et al. . |
| 4,066,513 | 1/1978 | Jablin . |
| 4,145,195 | 3/1979 | Knappstein et al. : |

FOREIGN PATENT DOCUMENTS

2653755 6/1977 Fed. Rep. of Germany ............. 201/39

Primary Examiner—Frank W. Lutter
Assistant Examiner—Roger F. Phillips
Attorney, Agent, or Firm—Wenderoth, Lind & Ponack

[57] ABSTRACT

Hot coke produced in a coke plant is introduced into the lower portion of a sealed interior of a quenching tower. Quenching water is supplied to the hot coke, thereby cooling the hot coke and generating steam and quenching gases which rise from the quenched coke to the upper portion of the interior of the quenching tower. Condensing water is supplied into the upper portion of the interior of the quenching tower, thereby condensing the steam to form quenching water condensate. A water mixture of the condensing water and the quenching water condensate is collected at a midportion of the interior of the quenching tower, and such water mixture is prevented from passing to the lower portion of the interior of the tower. The thus collected water mixture is discharged from the interior of the quenching tower, and the quenching gases remaining in the upper portion of the interior of the quenching tower are removed without being directly discharged into the exterior surrounding environment.

10 Claims, 3 Drawing Figures

APPARATUS FOR QUENCHING HOT COKE

This is a divisional application of Ser. No. 952,135, filed Oct. 17, 1978, now U.S. Pat. No. 4,246,072.

BACKGROUND OF THE INVENTION

The present invention is directed to a process and apparatus for quenching hot coke produced in a coke plant, and for thereafter recovering and utilizing the heat released from the hot coke during the quenching thereof.

More particularly, the present invention is directed to such a process and apparatus wherein hot coke produced in a coke plant is conveyed in a container, for example a transportable car, to a position beneath a removal shaft of a quenching tower, and water is sprayed onto the hot coke to quench the coke and generate steam and quenching gases.

During the quenching of coke, particularly coke which is produced from bituminous coal, by means of spraying water onto the coke, there are generated considerable quantities of steam as well as quenching gases, for example carbon monoxide, carbon dioxide, nitrogen, nitric oxides, hydrogen, hydrogen sulfide, and other harmful gases, as well as substances in powder form. The emission and introduction directly into the exterior surrounding atmosphere of such steam, quenching gases and powder substances results in a considerable stressing of the environment, the extreme degree of which has been fully understood only recently. Additionally, the direct release of heat from the hot coke into the exterior surrounding atmosphere represents a considerable energy loss.

German DT-OS No. 26 53 755 discloses a system wherein a charge of hot coke produced in a coke plant is positioned beneath a removal shaft of a quenching tower, and water is sprayed onto the hot coke, thereby quenching the coke and generating steam and quenching gases which rise upwardly into the removal shaft. A flue branches off from the removal shaft, and an adjustable flap shutter is arranged at the branch of the flue and the removal shaft to theoretically cause the steam and quenching gases to flow to the flue. Within the flue the steam is condensed by means of an evaporator and an expansion turbine, and the resultant condensate is thereafter removed.

However, this prior art system has several substantial inherent disadvantages. Specifically, the charge of hot coke to be quenched is located in an entirely open area, and this inherently allows a substantial heat loss. Additionally, in accordance with this prior art system, the quenching gases are directly discharged to the environment, thereby creating a substantial stressing and pollution of the environment. Additionally, a portion of the steam and quenching gases may at least partially escape through the flap shutter into the removal shaft and thereby be directly discharged to the environment.

Furthermore, in such prior art system, it is attempted to recover heat from the steam. This system is however inherently inefficient since it is possible for the steam to at least partially bypass the heat exchanger by leaking through the flap shutter and the removal shaft.

Even further, it is extremely difficult to adapt existing quenching towers to comply with such prior art system, due to the need for constructing the additional flue which must be connected to an existing quenching tower. Such construction and connection are in many cases just simply impossible.

It has also been known to wash steam resulting from a water quenching operation by means of water sprayed onto the steam to thereby remove flue coke with the washing water. In such a known arrangement however, it has been necessary to cause the quenching steam to travel through a circuitous path of travel defined by a plurality of baffle plates in a quenching tower. In such an arrangement however, it is possible for harmful gases to gather in dead spaces and thereafter be emitted.

SUMMARY OF THE INVENTION

With the above discussion in mind, it is a primary object of the present invention to provide an improved process and apparatus for quenching hot coke produced in a coke plant which overcomes the disadvantages of prior art systems.

It is a further object of the present invention to provide such a process and apparatus whereby quenching of the hot coke is carried out in a space which is completely sealed from the exterior surrounding environment, thereby preventing loss of heat from the hot coke to the exterior surrounding environment.

It is an even further object of the present invention to provide such a process and apparatus wherein the steam generated during the quenching of the hot coke is condensed by means of condensing water, and a water mixture formed of the condensing water and quenching steam condensate is collected.

It is a yet further object of the present invention to provide such a process and apparatus wherein quenching gases generated during the quenching of the hot coke are removed from the sealed space without being directly discharged into the exterior surrounding environment, thereby avoiding pollution of the surrounding atmosphere.

It is a still further object of the present invention to provide such a process and apparatus whereby heat is recovered from the water mixture.

It is a still even further object of the present invention to provide such a process and apparatus whereby such recovered heat is employed to purify waste water generated by the coke plant during the production of hot coke, such that the thus purified waste water may be utilized for industrial purposes and such that waste water need not be discharged from the overall coke plant, thereby preventing pollution of environmental water sources.

The above objects are achieved in accordance with the present invention by the provision of a process and apparatus wherein a charge of hot coke from a coke plant is introduced into the lower portion of the interior of a quenching tower. The interior of the quenching tower is completely sealed from the exterior surrounding environment. The quenching tower has at least one opening for the introduction of the charge of hot coke into the lower portion of the interior of the quenching tower, and such opening may be selectively closed and sealed for the introduction and removal of a charge of coke.

Quenching water is supplied into the lower portion of the interior of the quenching tower and is sprayed onto the charge of hot coke, thereby cooling the hot coke and generating steam and quenching gases which rise upwardly to the upper portion of the interior of the sealed quenching tower. Condensing water is supplied into the upper portion of the interior of the quenching tower, thereby condensing the steam to form quenching water condensate. The quenching water condensate and condensing water are thus collected as a water mixture at a midportion of the interior of the quenching tower. This water mixture is prevented from passing downwardly into the lower portion of the interior of the quenching tower. The water mixture is discharged from the interior of the quenching tower, and the quenching gases remaining in the upper portion of the quenching tower are removed therefrom without being directly discharged into the exterior surrounding environment.

The quenching gases, after removal thereof from the interior of the quenching tower, are treated for the removal of substances which are harmful to the environment. Preferably, the quenching gases are removed from the interior of the quenching tower by means of a suction of the coke plant, and the thus removed quenching gases are purified and utilized in the coke plant.

The water mixture which is removed from the interior of the quenching tower has the heat removed therefrom, such heat then being employed to vaporize waste water generated by the coke plant during the production of hot coke, thereby forming waste water steam and separated waste water residue. The waste water steam is then condensed to form purified water which may be used for industrial purposes, for example in the overall coke plant installation. The waste water residue is stored or further processed, for example to form fertilizers.

The disposal of waste water from coke plants employing bituminous coal for the production of coke has represented a considerable economic problem. Specifically, considerable quantities of water are needed for the production of coke and coke oven by-products. This necessity inherently results in considerable quantities of waste water which must be treated or purified. Such treatment and purification have in recent years become an even more acute problem due to the increased requirements for purity of waste water discharged to drains. Additionally, recent increases in the cost of industrial water have further accentuated the difficulty in obtained the necessary quantities of water for the production of coke and coke oven by-products.

However, as discussed above, in accordance with the present invention it is possible to employ heat recovered from the quenching of hot coke to purify waste water generated in the coke plant during the production of hot coke and to thereafter use the thus purified water in the coke plant. This substantially eliminates the need for discharge of waste water into drains, and further provides a ready-made internal source of purified water for use in the coke plant for the production of coke and coke oven by-products. That is, the heat which can be obtained in accordance with the present invention from the quenching water condensate is substantially sufficient for purifying waste water produced during the production of hot coke for further use in the coke plant.

More particularly in accordance with the present invention, the water mixture removed from the interior of the quenching tower is introduced into a collecting tank, and waste water generated by the coke plant during the production of hot coke is introduced into an evaporation tank. Heat is removed from the water mixture and transferred to the waste water by a heat pump of conventional design and configuration, thereby vaporizing the waste water to form waste water steam. The waste water steam is thereafter condensed by removing heat from the waste water steam by means of a further heat pump, and the heat removed from the waste water steam may be transferred to the waste water within the evaporation tank to thereby facilitate and aid in the vaporization of the waste water.

Preferably, the collecting tank has a capacity sufficient to receive therein a plurality of intermittently introduced quantities of water mixtures resulting from the successive quenching of a plurality of charges of hot coke. Thus, successive charges of hot coke may be intermittently quenched in the quenching tower, while heat may be continuously removed from water mixture in the collecting tank and transferred to the waste water, and the waste water may thereby be continuously vaporized.

In accordance with a further feature of the present invention, water mixture is removed from the collecting tank and introduced into the upper portion of the interior of the quenching tower as the condensing water.

In accordance with a further feature of the present invention, an assembly of louvers are arranged to extend across a midportion of the interior of the quenching tower. The louvers overlap each other with clearances therebetween to allow the upward passage of the steam and quenching gases generated during the quenching of the hot coke. However, the overlapped louvers prevent the collected water mixture from passing through such clearances. Preferably, the assembly of louvers is inclined downwardly toward one side of the quenching tower, such that the water mixture flows downwardly along the assembly of louvers and is thereat collected by a sump from which water is withdrawn and passed to the collecting tank.

BRIEF DESCRIPTION OF THE DRAWINGS

Other objects, features and advantages of the present invention will become apparent from the following detailed description, taken with the accompanying drawings, wherein.

DETAILED DESCRIPTION OF THE INVENTION

Figure 1:
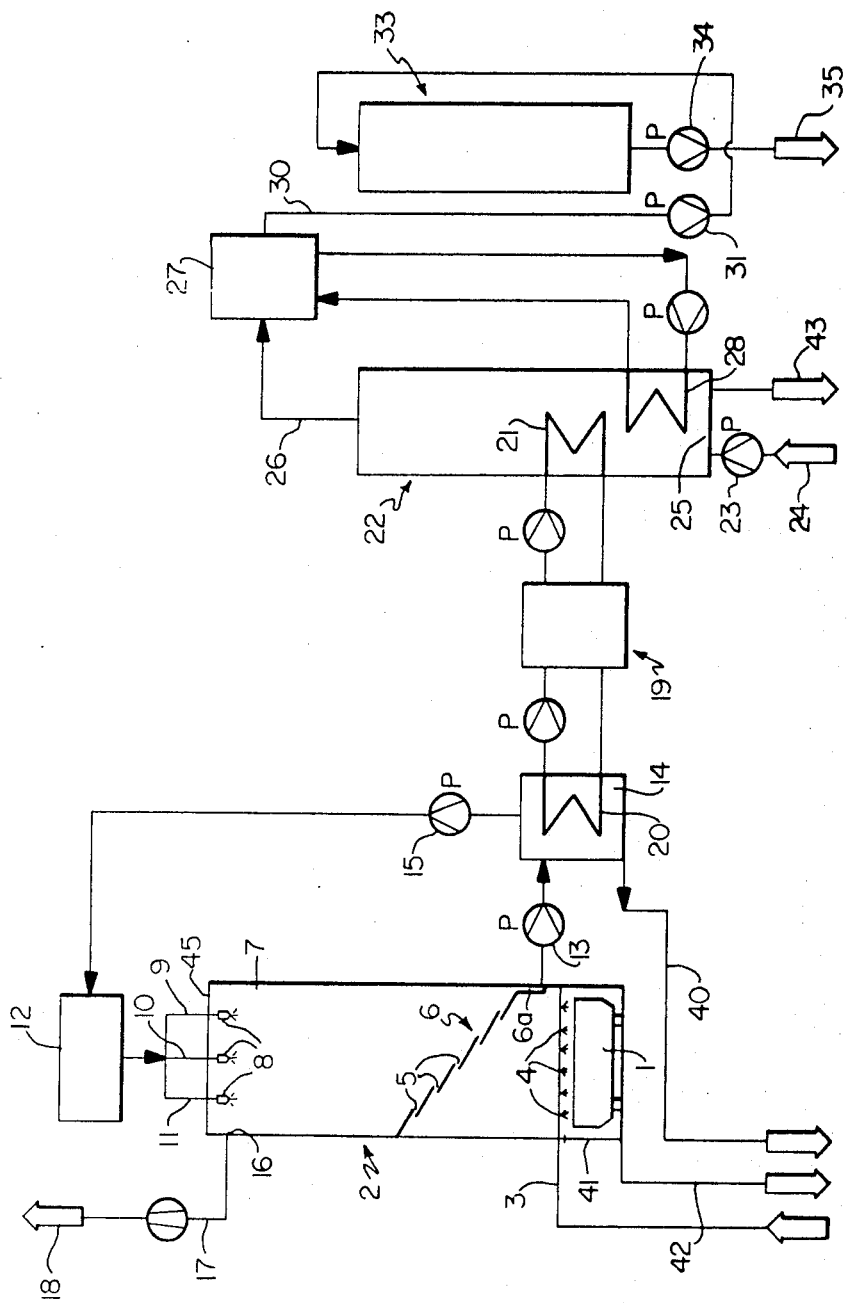
FIG. 1 is a schematic diagram illustrating the process and apparatus of the present invention.

With reference now to FIG. 1 of the drawings, one embodiment of the process and apparatus according to the present invention will be described in detail.

A quenching tower 2 has an interior which is adapted to be entirely sealed to the exterior surrounding environment. At the lower portion of the quenching tower 2 there is provided at least one passage opening 41 through which a charge of coke may be introduced into the lower portion of the interior of the quenching tower. Passage opening 41 is closed in a gastight manner, for example by means of gates or doors (not shown) having suitable sealing packings. The structure of passage opening 41 and the gate or doors and packings to selectively seal the passage opening are not shown in detail, since such structural elements may be any elements which are conventionally known. Any such conventional elements are sufficient, as long as the passage opening 41 may be opened to allow entry of a charge of hot coke, after which the passage opening is closed in an entirely gastight manner. The remainder of the interior of the quenching tower 2 is entirely sealed to the exterior surrounding environment.

The charge of hot coke to be quenched may be contained in any suitable container, for example such as quenching car 1 which may be introduced into and removed from the lower portion of the interior of the quenching tower 2 by means of rails. The lower portion of the interior of the quenching tower, within which is housed the charge of hot coke, may be a shaft shed the top of which opens into an upwardly extending removal shaft which forms the remainder of the interior of the quenching tower.

When a charge of hot coke is positioned at a desired setting up position within the shaft shed, and when passage opening 41 is sealed in a gastight manner, quenching of the hot coke may commence. For this purpose, quenching water is supplied into the lower portion of the interior of the quenching tower via water feed pipe 3 and is sprayed onto the top of the hot coke via nozzles 4. As the quenching water quenches the hot coke, there will be generated steam and quenching gases which will then rise upwardly through the interior of the quenching tower. Specifically, such steam and quenching gases will rise upwardly from the lower portion of the interior of the quenching tower, will pass through openings or clearances 5 between louvers 6 and will continue to rise up to the upper portion 7 of the interior of the quenching tower.

At the top of the quenching tower is arranged condensing structure for condensing the steam. Specifically, nozzles 8 are located at the top of the interior of the quenching tower and are supplied condensing water via pipes 9, 10 and 11 from a feed tank 12. Nozzles 8 release condensing water onto the steam in the upper portion of the interior of the quenching tower and thus condense the steam. The thus formed quenching water condensate and the condensing water are collected as a water mixture by means of overlapped louvers 6, whereby the water mixture flows downwardly along louvers 6 and is collected in a reservoir or sump 6a. It is specifically to be understood that the assembly of louvers 6 with clearances 5 therebetween may be replaced by any other equivalent structure located at a midportion of the interior of the quenching tower 2 and which allows upward passage of steam and quenching gases from the lower portion to the upper portion of the interior of the quenching tower, while enabling the water mixture to be collected and while preventing the water mixture from passing downwardly to the lower portion of the interior of the quenching tower.

Quenching water which is sprayed through nozzles 4 and which is not converted into steam may be withdrawn from the bottom of the interior of the quenching tower via pipeline 42 and may be suitably disposed of, for example by passage to a settling tank for treatment and further use.

The water mixture of quenching water condensate and condensing water may be removed from reservoir 6a via a pipeline and pump 13 into an insulated collecting tank 14. It is to be understood that the operation of condensing the quenching steam will be carried out under circumstances to provide the water mixture supplied into collecting tank 14 with a desired temperature, for example 90° C.

The overall coke production plant, as is known, generates waste water which in the past must be treated and then discharged into a drain. However, in accordance with the present invention the heat generated during the quenching of the hot coke within quenching tower 2 may be used to purify waste water from the coke plant, and thereby eliminate the previous need for treatment and discharge to a drain of such coke plant waste water.

Specifically, waste water generated by the coke plant during the production of hot coke, indicated at 24, may be supplied by means of a pump 23 into the interior of an evaporation tank 22.

A heat pump 19 includes a first heat exchanger 20 extending into the interior of collecting tank 14 and a second heat exchanger 21 extending into the interior of evaporation tank 22. The construction and operation of heat pumps are well known, and will therefore not be described in detail herein. However, heat pump 19 operates in a conventional manner to remove the heat from the water mixture within collecting tank 14 and to transfer such heat to the waste water within evaporation tank 22. This heat transfer will result in an evaporation or vaporization of the waste water, to thereby form waste water steam which will rise to the top of evaporation tank 22. The vaporization of the waste water will result in residual products from the waste water remaining in the lower or sump portion 25 of evaporation tank 22. Such residual products will mainly comprise salts, particularly ammoniacal salts, which may be removed as at 43 and thereafter stored or further processed, for example for utilization as fertilizers.

The evaporated waste water steam leaves the interior of evaporation tank 22 through a pipe 26. The waste water steam undergoes treatment by a further heat pump 27 which removes the sensible heat from the waste water steam, thereby condensing the waste water steam and removing head products, for example phenol, therefrom. The sensible heat removed from the waste water steam is transferred via a further heat exchanger 28 into the interior of evaporation tank 22 to thereby facilitate and aid in the vaporization of the waste water. The waste water condensate from further heat pump 27 is removed through pipe 30 by means of a pump 31 and is delivered to cooling tower 33, from which the waste water condensate is removed as purified water for further industrial use, for example within the coke plant, by means of pump 34, as indicated at 35.

Accordingly, in accordance with the present invention, it is possible to avoid the heretofore necessary treatment and disposal of waste water which is generated by a coke plant during the production of hot coke. More particularly, in accordance with the present invention, the heat from the hot coke is used to purify the coke plant waste water, and the thus purified waste water may thereafter again be used in the coke plant. This not only eliminates the need for discharging waste water to a drain, but also provides a built-in supply of purified water for the coke plant.

In accordance with a further feature of the present invention, the size or capacity of collecting tank 14 is sufficient to receive therein a plurality of intermittently introduced quantities of water mixtures resulting from the successive quenching of a plurality of charges of coke. Thus, charges of coke may be intermittently quenched and resultant water mixtures may be intermittently introduced into collecting tank 14, while heat may be continuously removed from water mixture existing in collecting tank 14 and transferred to the waste water within evaporation tank 22. Thereby, the waste water may be continuously vaporized.

In accordance with a further feature of the present invention, the condensing water supplied from feed tank 12 may be water mixture removed from the interior of collecting tank 14 and supplied to feed tank 12 by pump 15. Thereby, after heat is removed from the water mixture within collecting tank 14, the water mixture is then further used as condensing water to condense the quenching steam. Any excess water mixture beyond that required as condensing water may be removed via pipe 40 and discharged in a known manner, for example to a conventional settling apparatus and thereafter made available for further use in the coke plant.

In accordance with a further important feature of the present invention, the quenching gases in the upper portion of the interior of quenching tower 2 are not directly discharged to the exterior surrounding environment. Rather, an opening 16 located in the upper portion of the interior of the quenching tower is connected to a gas removal pipe 17. The quenching gases remaining within the upper portion of the interior of the quenching tower after the condensation of the quenching steam are drawn off as lean or weak gases through opening 16 and gas removal pipe 17, as indicated at 18. Such lean or weak gases are supplied to a gas processing or treatment unit. In accordance with a preferred arrangement of the present invention, the lean or weak gases are removed from the upper portion of the interior of the quenching tower by means of a crude gas suction pipe of the coke ovens of the coke plant, such elements inherently being conveniently located to the quenching tower, and thus any necessary treatment of the lean or weak gases and further utilization thereof may take place within the normal scope of facilities and operation of the coke plant. Such features in and of themselves are not novel and are therefore not shown or described in detail. However, the important feature of the present invention is that the quenching gases in the upper portion of the interior of the quenching tower 2 are not directly discharged to the exterior surrounding environment, and that the quenching system itself need not be provided with special quenching gas treatment facilities. Rather, the quenching gases are removed from the upper portion of the interior of the quenching tower, are treated as necessary within otherwise existing treatment facilities of the overall coke plant, and are thereafter utilized within the overall coke plant itself.

Thus, in accordance with the present invention there are provided a process and apparatus whereby hot coke may be quenched in a much more efficient manner by carrying out the quenching operation within an interior volume which is totally and completely sealed from the exterior surrounding environment. Thus, heat loss is avoided, and the exterior surrounding environment is protected from pollution. Also, the steam resulting from the quenching operation is condensed and collected as a mixture of quenching steam condensate and condensing water. Heat is removed from this water mixture and is recovered, rather than being wasted. In accordance with a specific feature of the present invention, this recovered heat is employed to purify coke plant waste water which would otherwise require separate treatment facilities and which would normally be discharged to a drain. This not only eliminates the need for providing facilities for such treatment, but also eliminates the cost of otherwise supplying pure water for industrial use, for example in the coke plant itself. Further in accordance with the present invention, the quenching gases generated during the quenching of the coke are not directly discharged to the exterior surrounding environment, thereby avoiding pollution of the environment. Furthermore, in accordance with the present invention the quenching gases are removed and treated in existing facilities within the surrounding overall coke plant, thereby eliminating the need for special quenching gas treatment facilities within the quenching operation itself.

Once the quenching operation is completed, passage opening 41 is opened, and the quenched charge of coke is removed, a fresh hot charge of coke is introduced, and then passage opening 41 is again closed in a gastight manner and a new quenching operation is commenced.

A particularly important feature of the present invention is that condensing water supplied through nozzles 8 leads to condensation effected by mixing of the condensing water with the quenching steam, and this transforms the quenching steam into a liquid phase which is intercepted and removed by louver assembly 6.

Figure 2:
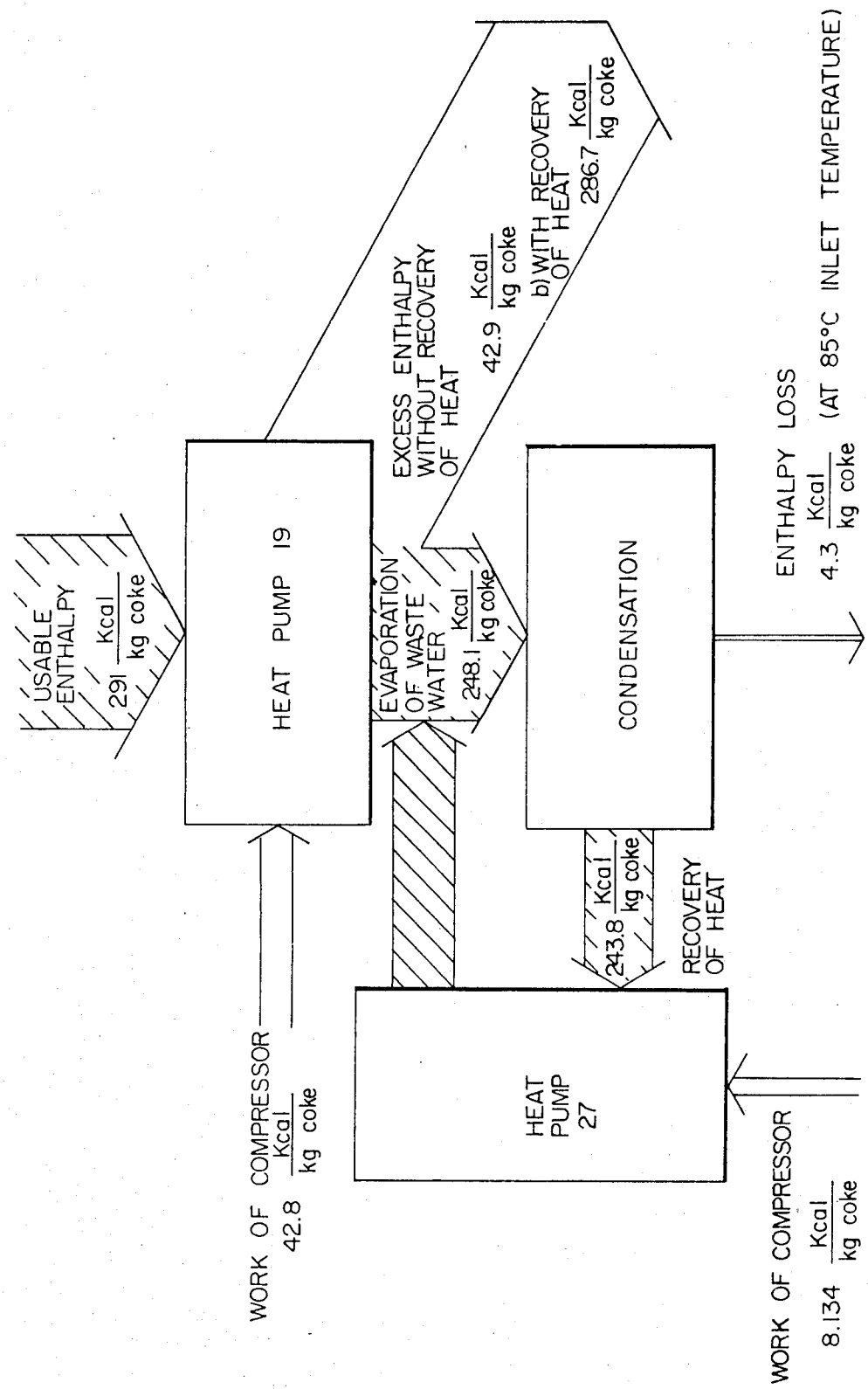
FIGS. 2 and 3 are heat balance diagrams illustrating heat balance features in accordance with two possible embodiments of the process of the present invention.

FIG. 2 is a heat balance diagram illustrating heat balance features in accordance with the process represented in FIG. 1. It is of course to be understood that the diagram of FIG. 2 is an approximation based on certain assumptions.

Experience has shown that in German coke oven plants, quenching will result in obtaining approximately 0.5 kg of water per kg of quenched coke. This value will be somewhat higher in the closed quenching tower of the present invention, since additional cooling of the coke by cold atmospheric air carried along through the quenching tower is avoided. The quenching steam in conventional wet type quenching towers will normally be 90° to 100° C. For the sealed quenching tower of the present invention, this temperature would be somewhat higher. The calculations of heat flow shown in FIG. 2 are therefore based on the assumption that at least 0.5 kg of water will be vaporized per kg of coke and that such vapor will attain a temperature of at least 90° C. Thus, the "useful enthalpy" per kg of the vapor will be with a:

Vaporization enthalpy = 557 kcal/kg; and

Specific enthalpy = 1 kcal/kg°C.

Assuming that the temperature of the condensing water is 65° C., then the useful or usable enthalpy absorbed in the water mixture and available for recovery by heat pump 19 will be at least (employing known thermal dynamic techniques):

$$0.5 \frac{\text{kg H}_2\text{O}}{\text{kg coke}} \times \left( 557 \frac{\text{kcal}}{\text{kg}} + 25° \text{ C.} \times 1 \frac{\text{kcal}}{\text{kg}° \text{ C.}} \right) = 291 \frac{\text{kcal}}{\text{kg coke}}$$

Assuming that condensing water is initially at a temperature of 65° C. and must be raised to a temperature of 110° C. for vaporization, then according to Carnot, Epsilon will equal 383/45 or 8.5. This means that to raise 85 kcal from 65° C. to 110° C., 10 kcal are realized by mechanical energy, i.e. by compressor work. Assuming a mechanical efficiency of 80%, the compressor work per 85 kcal is increased from 10 kcal to 12.5 kcal, and consequently the mechanical energy required by heat pump 19 will be 42.8 kcal/kg coke.

It has been determined that during the generation of waste water within the coke plant, at an assumed coke yield of coke to coal of 75%, waste water will be obtained in quantities of 0.43 kg H₂O/kg coke. It has further been assumed that the waste water is introduced into evaporation tank 22 at a temperature of at least 85°

C. Thus, for evaporation of the waste water at a temperature of 105° C. the required enthalpy to vaporized the waste water will be:

$$0.43 \frac{\text{kg H}_2\text{O}}{\text{kg coke}} \times \left(557 \frac{\text{kcal}}{\text{kg}} + 20° \text{C.} \times 1 \frac{\text{kcal}}{\text{kg}° \text{C.}}\right) = 248.1 \frac{\text{kcal}}{\text{kg coke}}$$

Thus, there will be an excess enthalpy of 42.9 kcal/kg coke. This does not include the enthalpy increase due to compressor work, so that the actual excess enthalpy will be somewhat higher.

To condense the waste water steam by heat pump 27, assuming that the temperature of the waste water steam will be dropped from 105° C. to 95° C., then the heat recovered by heat pump 27 and available to the waste water within evaporation tank 22 via heat exchanger 28 will be:

$$0.43 \frac{\text{kg H}_2\text{O}}{\text{kg coke}} \times \left(557 \frac{\text{kcal}}{\text{kg}} + 10° \text{C.} \times 1 \frac{\text{kcal}}{\text{kg}° \text{C.}}\right) = 243.8 \frac{\text{kcal}}{\text{kg coke}}$$

This means that the enthalpy loss will be 4.3 kcal/kg coke.

In calculating the compressor work for heat pump 27, according to Carnot, Epsilon equals 37.7. This means that 10 kcal mechanical energy, i.e. compressor work, are required to raise the temperature for 377 kcal from 95° C. to 105° C. For a mechanical efficiency of 80%, the mechanical energy is increased from 10 to 12.5 kcal. This means that for heat pump 27 a specific mechanical energy of 8.143 kcal/kg coke is necessary.

FIG. 2 also illustrates the arrangement whereby the heat recovered by heat pump 27 is not returned to the waste water within evaporation tank 22. In this case, the excess enthalpy is 291 kcal/kg coke−4.3 kcal/kg coke=286.7 kcal/kg coke.

Figure 3:
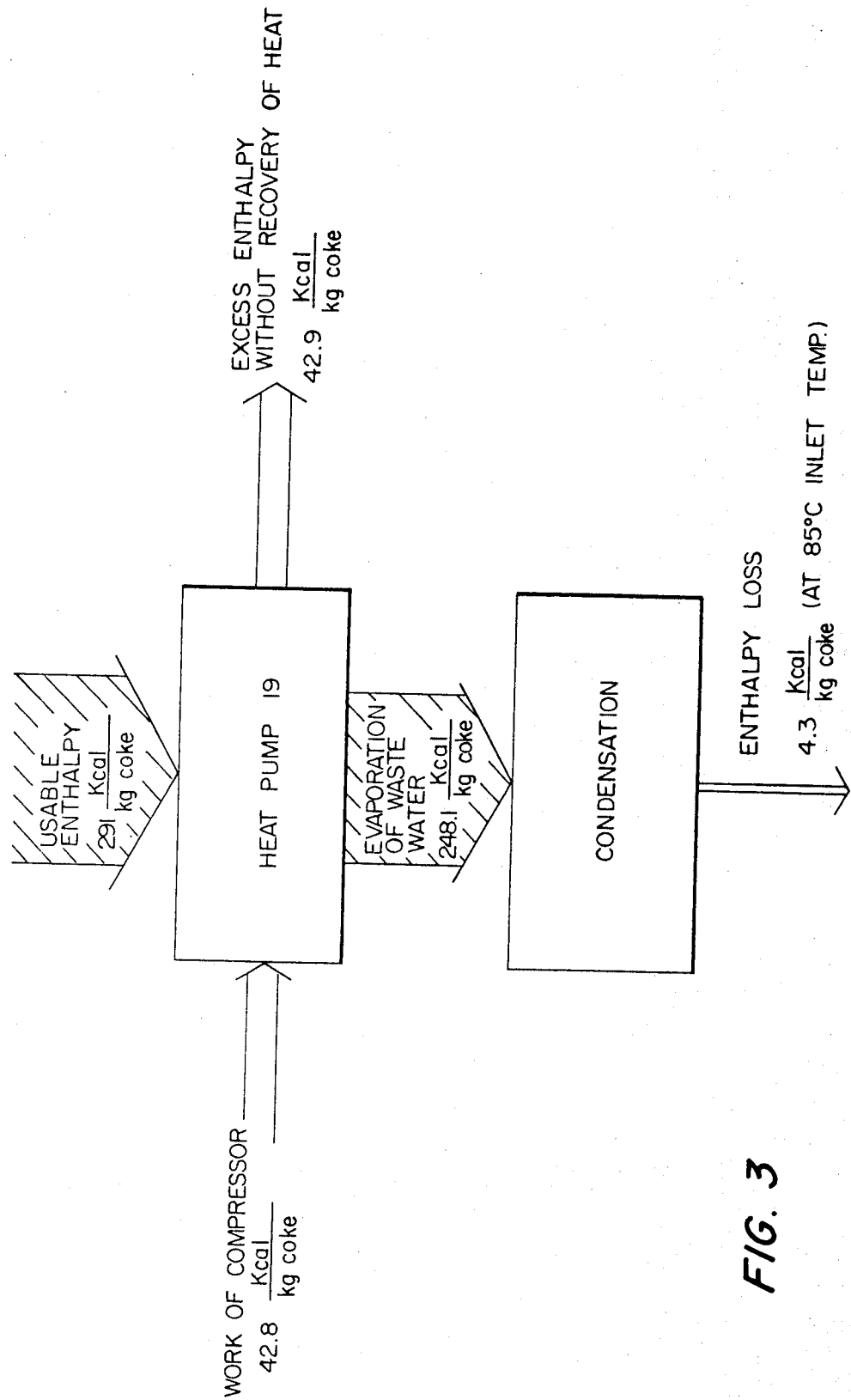

FIG. 3 is a heat balance diagram which is essentially similar to that of FIG. 2, but illustrating an arrangement whereby heat pump 27 is not provided. The heat balance values shown in FIG. 3 are based on the same assumptions discussed above regarding FIG. 2.

It is to be understood that the heat balance diagrams of FIGS. 2 and 3 are exemplary only and are provided merely for facilitating an understanding of the type of heat transfer relationships occurring in accordance with the present invention.

Although the present invention has been described and illustrated with respect to a preferred embodiment, it is to be understood that various modifications may be made to the specifically described and illustrated process and apparatus without departing from the scope of the present invention.

What I claim is:

1. An apparatus for quenching hot coke produced in a coke plant, said apparatus comprising:
    a quenching tower having an interior including an upper portion which is completely sealed from the exterior surrounding environment and a lower portion, said quenching tower having at least one opening means for introducing a charge of hot coke from a coke plant into said lower portion of the interior of said quenching tower, and means for selectively closing said opening means and for thereby completely sealing said lower portion of the interior of said quenching tower from the exterior surrounding environment;
    means for supplying quenching water into said lower portion of the interior of said quenching tower and onto a charge of hot coke positioned therein and for thereby cooling said hot coke and generating steam and quenching gases, which then rise to said upper portion of the interior of said quenching tower;
    means for supplying condensing water into said upper portion of the interior of said quenching tower and for thereby condensing said steam to form quenching water condensate;
    means, positioned at a midportion of the interior of said quenching tower, for collecting a water mixture of said condensing water and said quenching water condensate, while preventing said water mixture from passing to said lower portion of the interior of said quenching tower, and for allowing the upward passage therethrough of said steam and quenching gases rising from said lower portion to said upper portion of the interior of said quenching tower;
    means for discharging the thus collected water mixture from the interior of said quenching tower; and
    means for removing said quenching gases remaining in said upper portion of the interior of said quenching tower, after condensing of said steam, from the interior of said quenching tower without directly discharging said quenching gases into the exterior surrounding environment.

2. An apparatus as claimed in claim 1, wherein said quenching gas removing means comprises a suction pipe of the coke plant, said suction pipe opening into said upper portion of the interior of said quenching tower.

3. An apparatus as claimed in claim 1, further comprising means for removing heat from said water mixture, for transferring the thus removed heat to waste water generated by the coke plant during the production of hot coke, and for thereby vaporizing said waste water to form waste water steam and separated waste water residue, and means for condensing said waste water steam to form purified water.

4. An apparatus as claimed in claim 3, wherein said heat removing and transferring means comprises a collecting tank for receiving said water mixture from the interior of said quenching tower, an evaporation tank for receiving said waste water, and a heat pump including a first heat exchanger extending into said collecting tank and a second heat exchanger extending into said evaporation tank.

5. An apparatus as claimed in claim 4, wherein said condensing water supply means comprises means for removing said water mixture from said collecting tank and introducing the thus removed water mixture into said upper portion of the interior of said quenching tower as said condensing water.

6. An apparatus as claimed in claim 4, wherein said collecting tank has a capacity to receive therein a plurality of intermittently introduced quantities of water mixtures resulting from the successive quenching of a plurality of charges of coke, whereby heat may be continuously removed from water mixture in said collecting tank and transferred to said waste water, and whereby said waste water may be continuously vaporized.

7. An apparatus as claimed in claim 4, wherein said means for condensing said waste water steam comprises a further heat pump for removing heat from said waste water steam.

8. An apparatus as claimed in claim 7, wherein said further heat pump includes means for transferring said heat removed from said waste water steam to said waste water within said evaporation tank and for thereby facilitating the vaporization of said waste water.

9. An apparatus as claimed in claim 1, wherein said collecting means comprises an assembly of louvers extending across the interior of said quenching tower, said louvers overlapping each other with clearances therebetween to allow the upward passage of said steam and quenching gases.

10. An apparatus as claimed in claim 9, wherein said assembly of louvers is inclined downwardly toward one side of said quenching tower, such that said water mixture flows down said assembly of louvers toward said one side, and sump means at said one side for collecting said water mixture.

* * * * *